(12) United States Patent
Jung et al.

(10) Patent No.: US 9,176,593 B2
(45) Date of Patent: Nov. 3, 2015

(54) REMOTE CONTROL APPARATUS AND METHOD FOR CONTROLLING FUNCTIONS OF DISPLAY APPARATUSES

(71) Applicant: SAMSUNG ELECTRONICS CO., LTD., Suwon-si (KR)

(72) Inventors: Chang-joo Jung, Hwaseong-si (KR); Seok-hun Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 345 days.

(21) Appl. No.: 13/765,096

(22) Filed: Feb. 12, 2013

(65) Prior Publication Data

US 2013/0314383 A1    Nov. 28, 2013

(30) Foreign Application Priority Data

May 22, 2012    (KR) .................. 10-2012-0054281

(51) Int. Cl.
| | |
|---|---|
| G09G 5/00 | (2006.01) |
| G06F 3/02 | (2006.01) |
| G06F 3/0338 | (2013.01) |
| H04N 21/422 | (2011.01) |
| H04N 21/443 | (2011.01) |
| H04N 5/44 | (2011.01) |

(52) U.S. Cl.
CPC ............ *G06F 3/0227* (2013.01); *G06F 3/0338* (2013.01); *H04N 21/4221* (2013.01); *H04N 21/42222* (2013.01); *H04N 21/4438* (2013.01); *H04N 2005/4412* (2013.01)

(58) Field of Classification Search
CPC .............. G06F 3/0338; H04N 2005/4412; H04N 21/4221; H04N 21/42222; H04N 21/4438

USPC .................................................. 345/156, 184
See application file for complete search history.

(56) References Cited

U.S. PATENT DOCUMENTS

| | | |
|---|---|---|
| 2002/0063797 A1 | 5/2002 | Aratani et al. |
| 2010/0001980 A1* | 1/2010 | Kim et al. ............. 345/184 |
| 2011/0164066 A1* | 7/2011 | Beals et al. ............ 345/685 |

FOREIGN PATENT DOCUMENTS

| | | |
|---|---|---|
| CN | 200990644 Y | 12/2007 |
| EP | 1 760 573 A2 | 3/2007 |
| EP | 2 034 723 A1 | 3/2009 |
| GB | 2 363 584 A | 1/2002 |
| KR | 10-0606755 A | 7/2006 |
| WO | 2011/048528 A2 | 4/2011 |

OTHER PUBLICATIONS

Communication, dated Dec. 19, 2013, issued by the European Patent Office in counterpart European Patent Application No. 13150177.7.

* cited by examiner

*Primary Examiner* — Viet Pham
(74) *Attorney, Agent, or Firm* — Sughrue Mion, PLLC (57) ABSTRACT

A remote control apparatus and method for controlling a function of a display apparatus are provided. The remote control apparatus includes a communications device for communicating with a display apparatus; buttons for receiving a user command relating to function control of the display apparatus; a jog switch for allowing directional movement manipulation and push manipulation; and a controller for, after the user command is input through the buttons, generating and sending a control signal to set a different function of the display apparatus based on a manipulation state of the jog switch.

19 Claims, 9 Drawing Sheets

REMOTE CONTROL APPARATUS AND METHOD FOR CONTROLLING FUNCTIONS OF DISPLAY APPARATUSES

CROSS-REFERENCE TO RELATED APPLICATIONS

This application claims priority from 35 U.S.C. §119 (a) from Korean Patent Application No. 10-2012-0054281 filed on May 22, 2012 in the Korean Intellectual Property Office, the entire disclosure of which is incorporated herein by reference.

BACKGROUND

1. Field

Methods and apparatuses consistent with the exemplary embodiments relate to a remote control apparatus and a method for controlling functions of a display apparatus. More particularly, exemplary embodiments relate to a remote control apparatus and a method for controlling the operations of a display apparatus by using a remote control apparatus which includes a minimum number of buttons.

2. Description of the Related Art

In general, display devices such as smart televisions (TVs) and Internet Protocol TVs (IPTVs) provide not only broadcasting contents received through a tuner, but also various additional services such as Internet and home shopping. A remote control for controlling operations of the display device may include a plurality of input buttons for controlling basic operations of the display device, and a plurality of additional buttons for controlling operations relating to the additional service use. That is, a related art remote control includes a plurality of separate buttons arranged according to their respective functions. Based on the buttons, the display device executes different functions.

As such, while the remote control includes as many buttons as the different functions provided by the display device, the main buttons that a user may need are very limited. That is, the related art remote control includes many buttons that are rarely used, or that may not be necessary. Hence, the buttons located on the exterior of the related art remote control are not arranged in a simple manner, and therefore, it is inconvenient for the user to correctly recognize and utilize the buttons.

To address these problems, related art remote controls attempt to decrease the number of buttons by using a jog switch. However, since the manipulation or movement of the related art jog switch is limited to the up, down, left, and right directions, it is difficult to move a cursor displayed on a webpage or control games being played on the display apparatus.

SUMMARY

One or more exemplary embodiments are provided to solve the above-mentioned and/or other problems and disadvantages and an aspect of the exemplary embodiments simplifies a size, a structure, and the number of buttons of a remote control apparatus by including a jog switch allowing 360-degree direction manipulation and a plurality of buttons for controlling functions of a display apparatus.

One or more exemplary embodiments also allow a user to more easily use a remote control apparatus using an on screen display (OSD) menu displayed on a display apparatus.

According to an aspect of an exemplary embodiment, there is provided a remote control apparatus including a communications device for communicating with a display apparatus; buttons for receiving a user command relating to function control of the display apparatus; a jog switch for allowing directional movement manipulation and push manipulation; and a controller for, after the user command is input through the buttons, generating and sending a control signal for differently setting a function of the display apparatus according to a manipulation state of the jog switch.

The buttons may include a single key assigned a single function; and at least one multi-key assigned first and second functions.

After the multi-key is input, when at least one of the movement manipulation and the push manipulation of the jog switch is conducted within a preset threshold time, the controller may control the display apparatus to operate in one of the first and second functions assigned to the multi-key.

The first function may be set to the multi-key by priority and the second function is additionally set to the multi-key. When the multi-key is set to the second function and the multi-key is not input during the preset threshold time, the controller may restore the function of the multi-key to the first function.

The first function may include at least one of a mute function, a play function, a three-dimensional (3D) function, and a remote control function, and the second function may include a color key function relating to additional service use provided by the display apparatus.

When the multi-key is set to the first function and the multi-key is input, the controller may control the multi-key to operate one of the mute function, the play function, the 3D function, and the remote control function, according to an operation mode of the display apparatus.

When a manipulation command is input through the jog switch, the controller may control the display apparatus to perform a different operation according to an operation mode of the display apparatus.

When the display apparatus is in a broadcasting reception mode, the jog switch may operate as a control key for adjusting a broadcasting reception channel or a volume of the display apparatus. When the display apparatus is in a menu display mode, the jog switch may operate as a direction key for navigating the displayed menu. When the display apparatus is in a web browser mode, the jog switch may operate as a cursor key for moving a cursor displayed on a screen.

The jog switch may operate as an enter key or an exit key according to the push manipulation.

When the jog switch is moved or pushed, the controller may determine a movement direction of the jog switch based on two signal levels corresponding to X and Y axis slops generated by the corresponding manipulation, and send the determined direction information to the display apparatus.

According to an aspect of another exemplary embodiment, there is provided a display apparatus including a display; a communications device for communicating with a remote control apparatus; a storage for storing information for performing a function corresponding to a control signal received from the remote control apparatus; and a controller for, when receiving a control signal for differently setting a function of the display apparatus from the remote control apparatus, controlling to display a menu for setting a plurality of functions corresponding to the control signal on a screen.

The control signal may be generated by a user command input through a multi-key for receiving a user command relating to the control of functions of the display apparatus and a jog switch allowing directional movement manipulation and push manipulation in the remote control apparatus.

According to an aspect of another exemplary embodiment, there is provided method for controlling a function of a display apparatus in a remote control apparatus, the method including receiving a user command relating to the control of functions of the display apparatus, from a user; after the user command is input, generating a control signal for differently setting a function of the display apparatus according to a manipulation state of a jog switch allowing directional movement manipulation and push manipulation; and sending the generated control signal to the display apparatus.

The inputting operation may receive the user command through buttons comprising a single key assigned a single function and at least one multi-key assigned first and second functions.

The method may further include after the user command is input through the multi-key, when at least one of the movement manipulation and the push manipulation of the jog switch is conducted within a preset threshold time, setting one of the first and second functions assigned to the multi-key.

The first function may be set to the multi-key by priority and the second function is additionally set to the multi-key. When the multi-key is set to the second function and the multi-key is not input during the preset threshold time, the setting operation may restore the function of the multi-key to the first function.

The first function may include at least one of a mute function, a play function, a 3D function, and a remote control function, and the second function may include a color key function relating to additional service use provided by the display apparatus.

The method may further include when a manipulation command is input through the jog switch, setting a manipulation command of the jog switch so that the display apparatus performs a different operation according to an operation mode of the display apparatus; and sending the set manipulation command to the display apparatus.

The operation for setting the manipulation command may configure the jog switch to operate as a control key for adjusting a broadcasting reception channel or a volume of the display apparatus when the display apparatus is in a broadcasting reception mode, the jog switch operates as a direction key for navigating the displayed menu when the display apparatus is in a menu display mode, and the jog switch operates as a cursor key for moving a cursor displayed on the screen when the display apparatus is in a web browser mode.

The jog switch may operate as an enter key or an exit key according to the push manipulation.

When the jog switch is moved or pushed, the operation for sending the set manipulation command may determine a movement direction of the jog switch based on two signal levels corresponding to X and Y axis slopes generated by the corresponding manipulation, and send the determined direction information to the display apparatus.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION OF THE EXEMPLARY EMBODIMENTS

Reference will now be made in detail to the exemplary embodiments of the application, examples of which are illustrated in the accompanying drawings, wherein like reference numerals refer to the like elements throughout. The exemplary embodiments are described below to explain the present application by referring to the figures.

Figure 1:
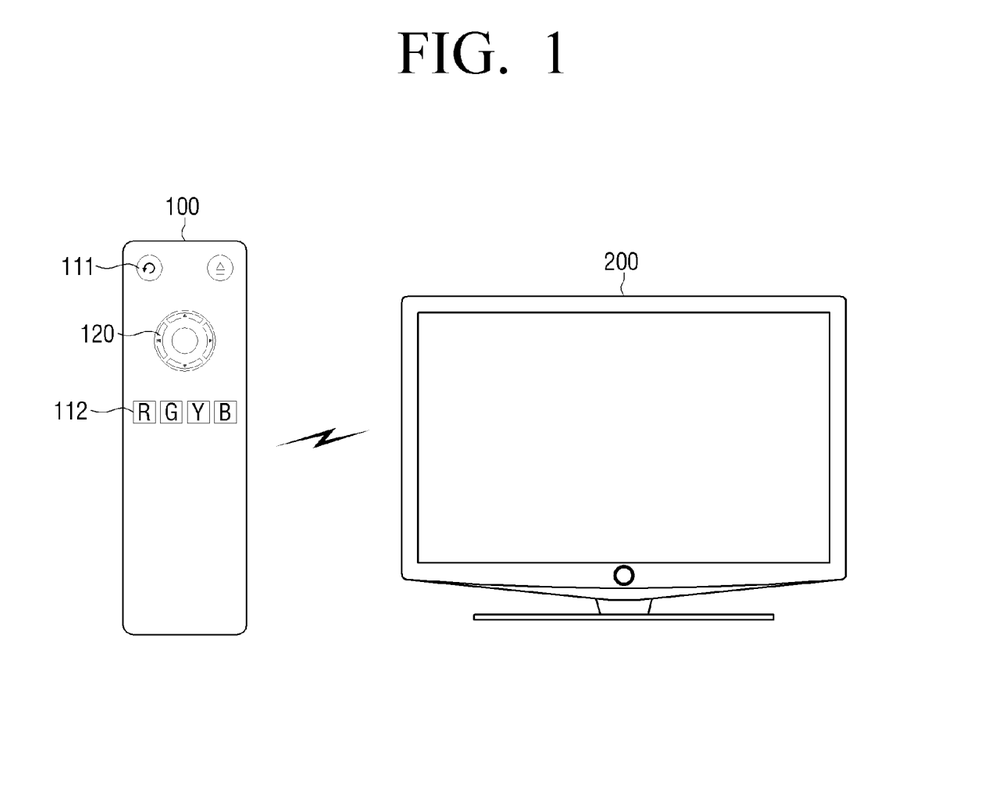
FIG. 1 is a diagram of operations between a remote control apparatus and a display apparatus according to an exemplary embodiment.

FIG. 1 is a diagram of operations between a remote control apparatus and a display apparatus according to an exemplary embodiment.

As shown in FIG. 1, the remote control apparatus 100 is a device for controlling functions of the display apparatus 200 and can be, for example, a remote control. The display apparatus 200 provides a user with contents or a webpage received over the air, a cable or Internet. The remote control apparatus 100 for controlling functions of the display apparatus 200 includes at least one button 110 (see FIG. 3) and a jog switch 120. Hence, when the user inputs or manipulates at least one of the at least one buttons 110 and the jog switch 120, the remote control apparatus 100 generates and sends a control signal to the display apparatus 200 using short-range wireless communication such as infra-red (IR) or Bluetooth. Thus, the display apparatus 200 can perform a function corresponding to the control signal wirelessly received from the remote control apparatus 100.

Figure 3:
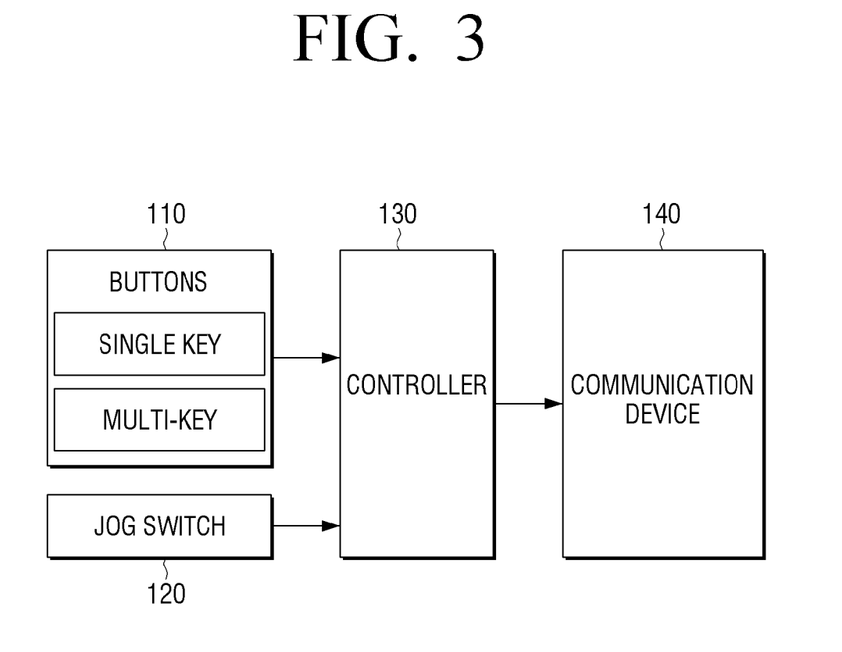
FIG. 3 is a block diagram of the remote control apparatus according to an exemplary embodiment.

The at least one button 110 of the remote control apparatus 100 includes at least one single key 111 with a single function, and at least one multi-key 112, with multiple functions. The single key 111, which is assigned a single function, can be a key of high frequency of use (for example, return and smart hub). The multi-key 112 may be a key for using a plurality of functions not frequently used, with the single key.

The multi-keys 112 can be equipped in different colors R, G, Y and B in the remote control apparatus 100 as shown in FIG. 1. Accordingly, the multi-keys 112 represented in the different colors R, G, Y and B can execute a function relating to an additional service use corresponding to the colors among additional services (for example, a product purchase provided in a home shopping program, and the downloading of a TV game service) provided by the display apparatus 200, and one of a mute function, a play function, a 3D function, and a remote control function. Although the colors of the multi-keys are depicted as R, G, Y, and B, the colors of the multi-keys are not limited thereto, and any color may be used.

Hereafter, the available functions of the multi-keys 112 of the different colors R, G, Y and B in the remote control apparatus 100 according to an exemplary embodiment are explained.

Figure 2:
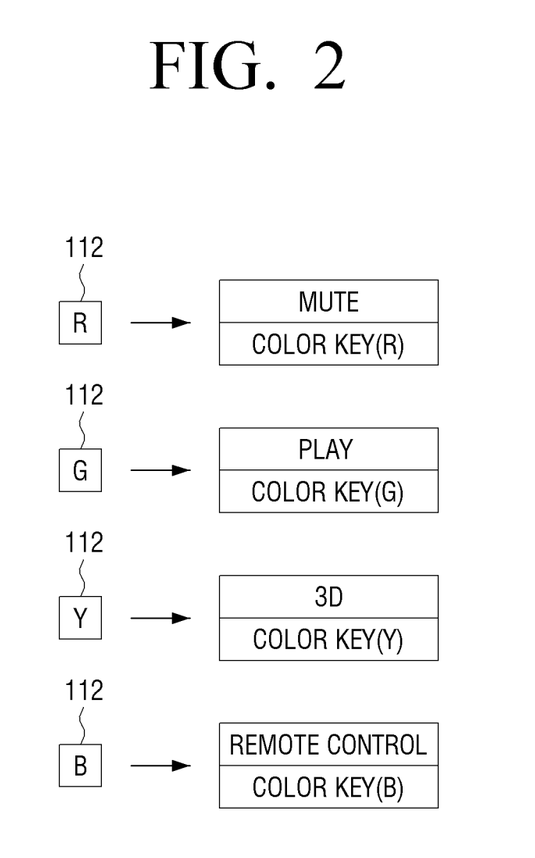
FIG. 2 is a diagram of available functions of multi-keys of different colors in the remote control apparatus according to an exemplary embodiment.

FIG. 2 is a diagram of available functions of the multi-keys of different colors in the remote control apparatus according to an exemplary embodiment.

As shown in FIG. 2, the multi-keys 112 of the different colors R, G, Y and B in the remote control apparatus 100 can perform a plurality of functions. It is preferable that the multi-keys 112 can perform different functions respectively.

In various exemplary embodiments, the R multi-key 112 in the red color conducts the mute function for muting the sound output from a speaker of the display apparatus 200 and a function for requesting the additional service corresponding to a color key R of a general remote control. The G multi-key 112 in the green color conducts the play function for controlling the play of a video content displayed in the display apparatus 200 and a function for requesting the additional service corresponding to a color key G of the general remote control. The Y multi-key 112 in the yellow color conducts the 3D function for requesting to play the 3D video content in the display apparatus 200 and a function for requesting the additional service corresponding to a color key Y of the general remote control. The B multi-key 112 in the blue color conducts the remote control function for performing a function relating to the general remote control and a function for requesting the additional service corresponding to a color key B of the general remote control. Although the functions of the R, G. Y, and B multi-keys are indicated to respectively correspond to a mute function, a play function, a 3D function, and a remote control function, the functions are not limited thereto, and additional functions may be assigned to each multi-key.

For example, the R multi-key 112 can perform the function for purchasing a product provided in the home shopping through the display apparatus 200 and the mute function for muting the sound output from the speaker of the display apparatus 200. Hence, in order to purchase a product provided in the home shopping through the display apparatus 200 or to mute the sound output from the speaker of the display apparatus 200, the user selects and presses the R multi-key 112 among the multi-keys 112 of the different colors R, G, Y and B of the remote control apparatus 100. Accordingly, when a user command relating to the R multi-key 112 is input, the remote control apparatus 100 sends a control signal corresponding to the input user command to the display apparatus 200. The display apparatus 200 can purchase the home shopping product currently displayed or mute the sound output from the speaker of the display apparatus 200.

The jog switch 120 allows the 360-degree direction movement and the push manipulation. The manipulation of the jog switch 120 can adjust a channel and a volume displayed in the display apparatus 200, select a menu displayed in the display apparatus 200, or move the displayed cursor. That is, the function of the jog switch 120 is differently set according to whether an operation mode of the display apparatus 200 is a broadcasting reception mode, a menu display mode, or a web browser mode.

As such, the remote control apparatus 100 can control the functions of the display apparatus 200 with a minimum number of input buttons. Various User Interfaces (UIs) can be provided to the user by differently setting the function of the jog switch 120 according to the operation mode of the display apparatus 200.

So far, the operations between the remote control apparatus 100 and the display apparatus 200 have been briefly described. Now, structures of the remote control apparatus 100 and the display apparatus 200 according to an exemplary embodiment are explained in detail.

FIG. 3 is a block diagram of the remote control apparatus according to an exemplary embodiment.

As shown in FIG. 3, the remote control apparatus 100 includes buttons 110, a jog switch 120, a controller 130, and a communications device 140. The buttonst 110 receive the user command relating to the function control of the display apparatus 200. The buttons 110 include the single key 111 assigned a single function and the multi-key 112 assigned a plurality of functions, that is, at least first and second functions.

Herein, the single key 111 is assigned a single function and can be the key which is frequently used (for example, return and smart hub). The multi-key 112 can be the key for using a plurality of functions which are not frequently used, with the single key. The multi-key 112 can be equipped in different colors R, G, Y and B in the remote control apparatus 100 as shown in FIG. 1. Accordingly, the multi-key 112 represented in the different colors R, G, Y and B can execute one (the first function) of the mute function, the play function, the 3D function, and the remote control function, and the function (the second function) relating to the additional service use corresponding to the colors among the additional services (for example, the product purchase provided in the home shopping and the TV game service loading) provided by the display apparatus 200. That is, the first function assigned to the multi-key 112 may be a function that is not frequently used among the functions for controlling the operations of the display apparatus 200. The second function assigned to the corresponding multi-key 112 can be the color key function relating to the additional service use provided by the display apparatus 200. The multi-key 112 has been illustrated in detail by referring to FIGS. 1 and 2 and thus their functional description shall be omitted.

The jog switch 120 is the switch allowing the directional movement manipulation and the push manipulation. The jog switch 120 allows the up, down, left, and right movement like a joystick in addition to the 360-degree movement manipulation, and conducts the push manipulation like a button switch. After the user command is input through the buttons 110, according to the manipulation state of the jog switch 120, the controller 130 for controlling the operations of the components generates and sends a control signal for differently setting functions of the display apparatus 200, to the display apparatus 200. After the multi-key 112 is input, when at least one of the movement manipulation and the push manipulation of the jog switch 120 is performed within a preset threshold time, the controller 130 controls the display apparatus 200 to perform one of the first and second functions assigned to the multi-key 112.

More specifically, to change the function of the multi-key 112 assigned the first and second functions, the controller 130 can generate a control signal for displaying an OSD menu to guide the first and second functions of the corresponding multi-key 112 to the display apparatus 200. For example, when the user presses the multi-key 112 during the preset threshold time, the controller 130 can determine the user command relating to the OSD menu display and generate a corresponding control signal. For example, after the user command is input through the multi-key 112, when at least one of the movement manipulation and the push manipulation of the jog switch 120 is performed within the preset threshold time, the controller 130 can determine the user command relating to the OSD menu display and generate a corresponding control signal.

Next, the controller 130 sends the generated control signal relating to the OSD menu display to the display apparatus 200. The display apparatus 200 receiving the control signal can display an OSD menu guiding the first and second functions assigned to the corresponding multi-key 112 on its screen. Herein, the OSD menu guiding the first and second functions assigned to the multi-key 112 can be divided into a first region guiding the first function and a second region guiding the second function. When the OSD menu is being displayed and the user manipulates the movement of the jog switch 120, the controller 130 sends a control signal corresponding to the manipulation to the display apparatus 200. Hence, the display apparatus 200 can highlight and display the region corresponding to the received control signal among the first and second regions guiding the first and second functions.

As such, when the region corresponding to the movement manipulation of the jog switch 120 is highlighted among the first and second regions guiding the first and second functions and the user applies the push manipulation of the jog switch 120, the controller 130 can change the function of the corresponding multi-key 112 to the function corresponding to the highlighted region among the first and second functions. Next, when the user command of the corresponding multi-key 112 is input, the controller 130 can send a control signal relating to the changed function to the display apparatus 200 so that the display apparatus 200 can operate based on the changed function.

For example, the remote control apparatus 100 can include the plurality of the multi-keys 112 which are represented in the different colors R, G, Y and B and assigned the different functions as shown in FIGS. 1 and 2. Among the multi-keys 112, the user can press during the preset threshold time, the R multi-key 112 assigned the first function relating to the mute function and the second function for requesting the additional service corresponding to the color key R of the general remote control. Alternatively, the user can press the R multi-key 112 and then move or push the jog switch 120 within the preset threshold time.

When such an event occurs, the controller 130 determines the user request for changing the function of the R multi-key 112 and sends to the display apparatus 200 a control signal for displaying the OSD menu relating to the R multi-key 112. Hence, the display apparatus 200 can display the OSD menu guiding the first and second functions assigned to the R multi-key 112 on the screen. At this time, the display apparatus 200 can highlight and display the region corresponding to the currently set function among the first and second functions assigned to the R multi-key 112.

When the first function is currently set to the R multi-key 112, the region corresponding to the first function can be highlighted and displayed. To change the function of the R multi-key 112 to the second function while the OSD menu is displayed, when the user performs at least one of the movement manipulation and the push manipulation of the jog switch 120, the controller 130 can change the first function set to the R multi-key 112 to the second function. As such, as the function of the R multi-key 112 is changed to the second function, the user can request the second function, that is, the additional service corresponding to the color key R of the general remote control through the R multi-key 112.

Among the first and second functions assigned to the multi-key 112, it is preferred that the first function is set to the multi-key 112 by priority and the second function is additionally set to the multi-key 112. Accordingly, when the corresponding multi-key 112 is not input during the preset threshold time while the user sets the multi-key 112 to the second function, the controller 130 can restore the second function of the multi-key 112 to the first function according to a preset condition.

When the function of the multi-key 112 is set to the first function and the user inputs the corresponding multi-key 112, the controller 130 can control the first function set to the multi-key 112 to operate one of the mute function, the play function, the 3D function, and the remote control function according to the operation mode of the display apparatus 200. For example, when the operation mode of the display apparatus 200 is the broadcasting reception mode and the multi-key 112 set to the first function is input, the controller 130 controls the multi-key 112 to perform the mute function. Thus, the display apparatus 200 can mute the sound output from the speaker.

Figure 5:
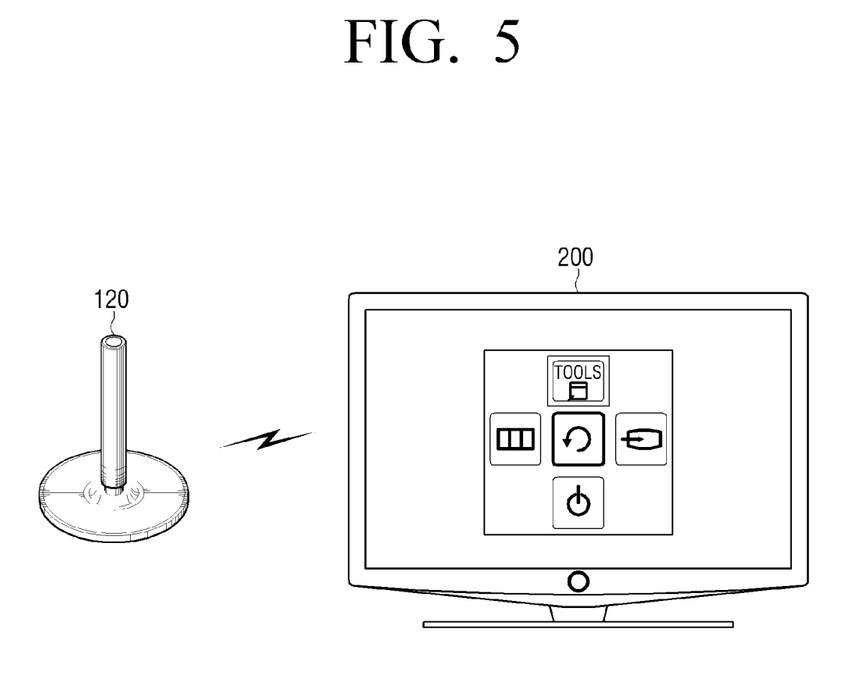
FIG. 5 is a diagram of the jog switch operating as a direction key according to exemplary an embodiment.
Figure 6:
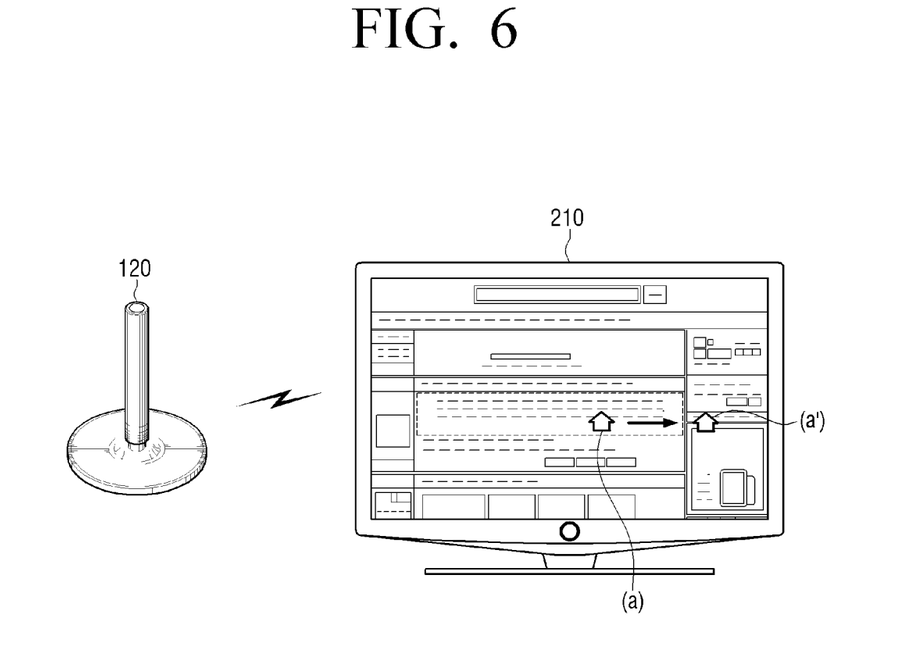
FIG. 6 is a diagram of the jog switch operating as a cursor key according to an exemplary embodiment.

When the manipulation command is input through the jog switch 120, the controller 130 can control the display apparatus 200 to perform the different operation according to its operation mode. That is, the jog switch 120 can perform the different function based on the operation mode of the display apparatus 200 so as to control the display apparatus 200 as shown in FIGS. 4, 5 and 6.

Figure 4:
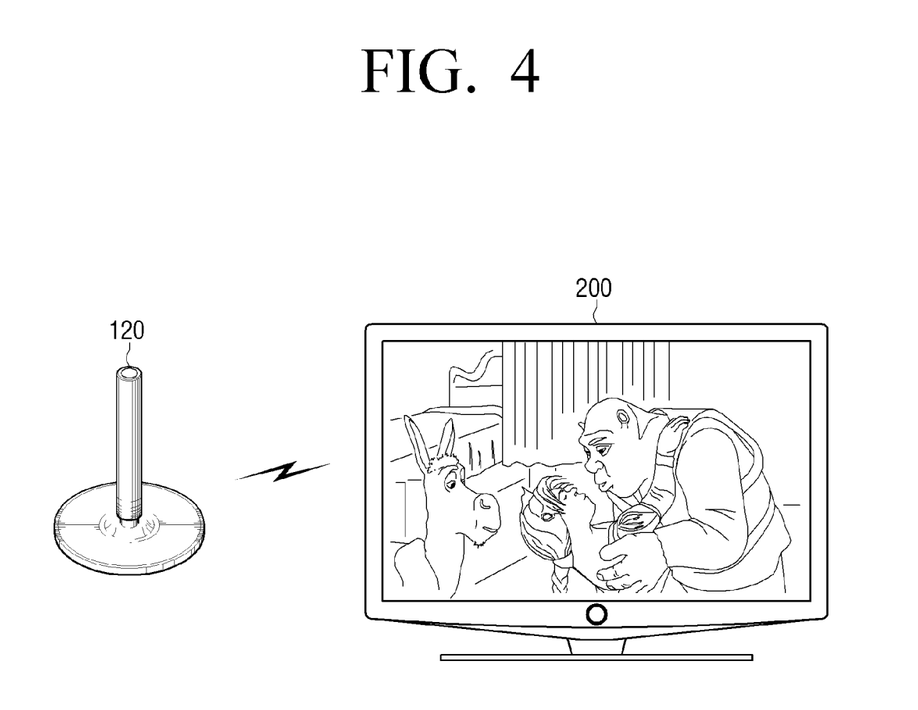
FIG. 4 is a diagram of a jog switch operating as a control key according to an exemplary embodiment.

FIG. 4 is a diagram of the jog switch operating as the control key according to an exemplary embodiment.

As shown in FIG. 4, the display apparatus 200 can operate in a broadcasting reception mode to display the broadcasting content provided from an external source via a relay terminal such as a tuner or a set-top box, on the screen. When the display apparatus 200 operates in the broadcasting reception mode, the user can manipulate the jog switch 120 of the remote control apparatus 100. In this case, the jog switch 120 can serve as the control key for adjusting the broadcasting reception channel or the volume of the display apparatus 200. When the jog switch 120 serves as the control key, the horizontal movement manipulation can change the broadcasting reception channel of the display apparatus 200. The vertical movement manipulation can adjust the volume of the sound output from the speaker of the display apparatus 200.

Hence, when the display apparatus 200 operates in the broadcasting reception mode and the user manipulates the jog switch 120 in one of the up, down, left, and right directions, the display apparatus 200 can change the channel or adjust the volume.

FIG. 5 is a diagram of the jog switch serving as the direction key according to an exemplary embodiment.

As shown in FIG. 5, the display apparatus 200 can operate in the menu display mode and display a menu window such as an OSD menu, on the screen. When the display apparatus 200 operates in the menu display mode, the user can manipulate the jog switch 120 of the remote control apparatus 100. In this case, the jog switch 120 can serve as the direction key to navigate the OSD menu displayed on the screen of the display apparatus 200. The screen of the display apparatus 200 can display the OSD menu relating to Menu, Tools, Source, and Power off as shown in FIG. 5. When the jog switch 120 is manipulated in one of the up, down, left, and right directions, the display apparatus 200 can highlight the OSD menu located in the direction corresponding to the movement manipulation. When the push manipulation is applied to the jog switch 120 while the OSD menu is highlighted according to the user's manipulation, the display apparatus 200 can display a submenu relating to the highlighted OSD menu on the screen or perform an operation relating to the corresponding OSD menu.

As such, when the display apparatus 200 operates in the menu display mode, the jog switch 120 can serve as the direction key for selecting one of a plurality of OSD menus displayed on the screen of the display apparatus 200.

FIG. 6 is a diagram of the jog switch operating as the cursor key according to an exemplary embodiment.

As shown in FIG. 6, the display apparatus 200 can operate in the web browser mode and display the web page provided from an external source over the Internet on its screen. The display apparatus 200 can display a cursor for selecting the content of the web page displayed on the screen, on the screen. When the display apparatus 200 operates in the web browser mode, the user can manipulate the jog switch 120 of the remote control apparatus 100. In this case, the jog switch 120 can serve as the cursor key for moving the cursor displayed on the screen of the display apparatus 200. When the web page is displayed on the screen of the display apparatus 200 and the jog switch 120 is moved to the 3 o'clock position as shown in FIG. 6, the cursor displayed at a point "a" on the screen of the display apparatus 200 can be moved and displayed at a point "a'" in the direction corresponding to the movement manipulation of the jog switch 120. As such, when the jog switch 120 is pushed while the cursor is moved according to the user's manipulation, the display apparatus 200 displays a web page relating to the content corresponding to the point "a'" on the screen.

When the display apparatus 200 operates in the web browser mode, the jog switch 120 can operate as the cursor key for moving the cursor displayed on the screen of the display apparatus 200.

When the jog switch 120 serving as one of the control key, the direction key, and the cursor key is moved or pushed, the controller 130 can determine the movement direction of the jog switch 120 based on two signal levels corresponding to X and Y axis slopes generated by the corresponding manipulation, and send the determined direction information to the display apparatus 200.

In more detail, when the jog switch 120 is moved or pushed, the controller 130 can detect X and Y axis signal levels according to the corresponding manipulation. Herein, the X and Y axis signal levels can be detected as 0V~3.3V, and the controller 130 can determine the movement direction of the jog switch 120 based on the detected X and Y axis signal levels under a preset condition. For example, when the X and Y axis signal levels are detected as 0V and 1.65V according to the movement manipulation of the jog switch 120, the controller 130 determines that the jog switch 120 is moved to the left. When the X and Y axis signal levels are detected as 3.3V and 1.65V, the controller 130 can determine that the jog switch 120 is moved to the right. For example, when the X and Y axis signal levels are detected as 1V and 2V according to the movement manipulation of the jog switch 120, the controller 130 determines that the jog switch 120 is moved to the upper left. When the X and Y axis signal levels are detected as 2V and 1V, the controller 130 can determine that the jog switch 120 is moved to the lower right.

As such, the controller 130 can determine the movement direction of the jog switch 120 based on the two signal levels generated by the movement manipulation of the jog switch 120, and thus determine the movement direction according to the 360-degree movement manipulation of the jog switch 120.

So far, the structure of the remote control apparatus 100 including the multi-key 112 assigned the plurality of the functions and the jog switch 120 allowing the 360-degree movement manipulation has been illustrated in detail. Hereafter, the structure of the display apparatus 200 operating according to the control command of the remote control apparatus 100 is explained in detail.

Figure 7:
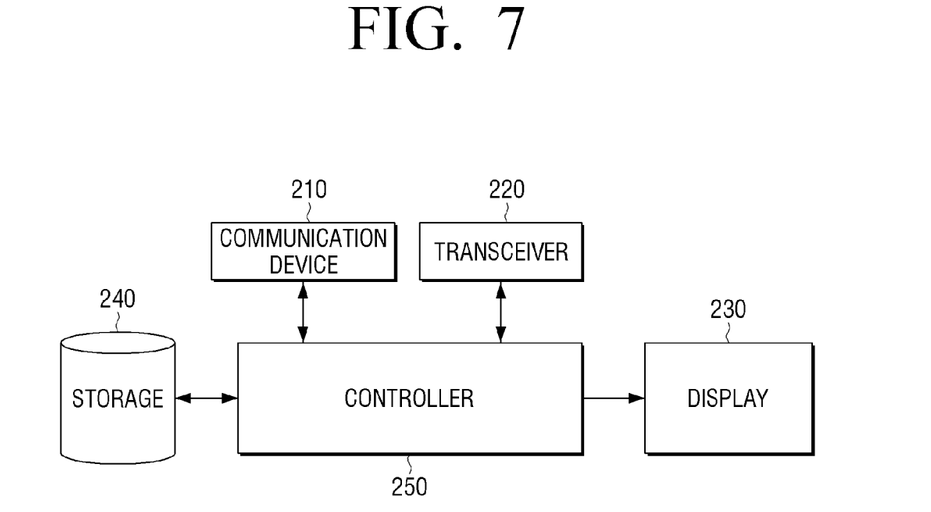
FIG. 7 is a block diagram of the display apparatus according to an exemplary embodiment.

FIG. 7 is a block diagram of the display apparatus according to an exemplary embodiment As shown in FIG. 7, the display apparatus 200 includes a communications device 210, a transceiver 220, a display 230, a storage 240, and a controller 250.

The communications device 210 communicates with the remote control apparatus 100, and the transceiver 220 receives the content provided from an external device via the relay device such as a set-top box or the Internet. The display 230 displays the OSD menu corresponding to the control command received from the remote control apparatus 100 on the screen, or receives and displays the content provided from the external device through the transceiver 220 on the screen.

The storage 240 stores information for executing the function corresponding to the control signal received from the remote control apparatus 100. Herein, the information stored in the storage 240 can include the menu information relating to the function of the display apparatus 200 and the information for performing the function of the display apparatus 200 according to the user command corresponding to at least one input of the buttons 110 including the single key 111 and the multi-key 112 and the jog switch 120 of the remote control apparatus 100. The information stored in the storage 240 can include the OSD menu guiding the first and second functions assigned to the multi-key 112.

When receiving the control signal for differently setting the function of the display apparatus 200 from the remote control apparatus 100, the controller 250 controls to display on the screen a menu for setting the plurality of functions corresponding to the received control signal, based on the information stored to the storage 240.

Herein, preferably, the control signal received from the remote control apparatus 100 is the signal generated according to the user command which is input through the multi-key 112 for inputting the user command relating to the function control of the display apparatus 200 and the jog switch 120 allowing the multiple direction movement manipulation and the push manipulation in the remote control apparatus 100.

In detail, upon receiving the control signal generated according to the user command input through the buttons 110 including the single key 111 and the multi-key 112 or the jog switch 120 from the remote control apparatus 100, the controller 250 can conduct the function relating to the received control signal based on the information stored in the storage 240. For example, when receiving the control signal relating to the broadcasting channel change from the remote control apparatus 100, the controller 250 can receive and display the broadcasting content over the broadcasting channel corresponding to the control signal received through the transceiver 220, through the display 230.

For example, when receiving the control signal related to the function change of the multi-key 112 from the remote control apparatus 100, the controller 250 can display the OSD menu guiding the first and second functions assigned to the corresponding multi-key 112 on the screen through the display 230, based on the information stored in the storage 240. At this time, the controller 250 can highlight the region corresponding to the current function among the first and second functions assigned to the multi-key 112. As such, when the OSD menu guiding the first and second functions assigned to the corresponding multi-key 112 is displayed on the screen and the control signal relating to the manipulation command of the jog switch 120 is received from the remote control apparatus 100, the controller 250 can highlight the region corresponding to the function corresponding to the control signal.

When receiving the control signal from the remote control apparatus 100, the controller 250 can perform the operation corresponding to the received control signal according to the operation mode of the display apparatus 200. For example, when the display apparatus 200 is operating in the broadcasting reception mode and the control signal related to the manipulation command of the jog switch 120 is received from the remote control apparatus 100, the controller 250 can adjust the broadcasting reception channel or the volume according to the received control signal.

For example, when the display apparatus 200 is operating in the menu display mode and the control signal related to the manipulation command of the jog switch 120 is received from the remote control apparatus 100, the controller 250 can highlight the OSD menu positioned in the direction corresponding to the received control signal.

For example, when the display apparatus 200 is operating in the web browser mode and the control signal related to the manipulation command of the jog switch 120 is received from the remote control apparatus 100, the controller 250 can move the cursor displayed on the screen in the direction corresponding to the received control signal.

As such, the controller 250 of the display apparatus 200 can adaptively change the function relating to the control signal received from the remote control apparatus 100 according to the operation mode of the display apparatus 200, and perform the operation of the display apparatus 200 with the changed function.

So far, the structure of the display apparatus 200 according to the present exemplary embodiment has been explained in detail. Now, a method for controlling the operation of the display apparatus 200 in the remote control apparatus 100 is elucidated.

Figure 8:
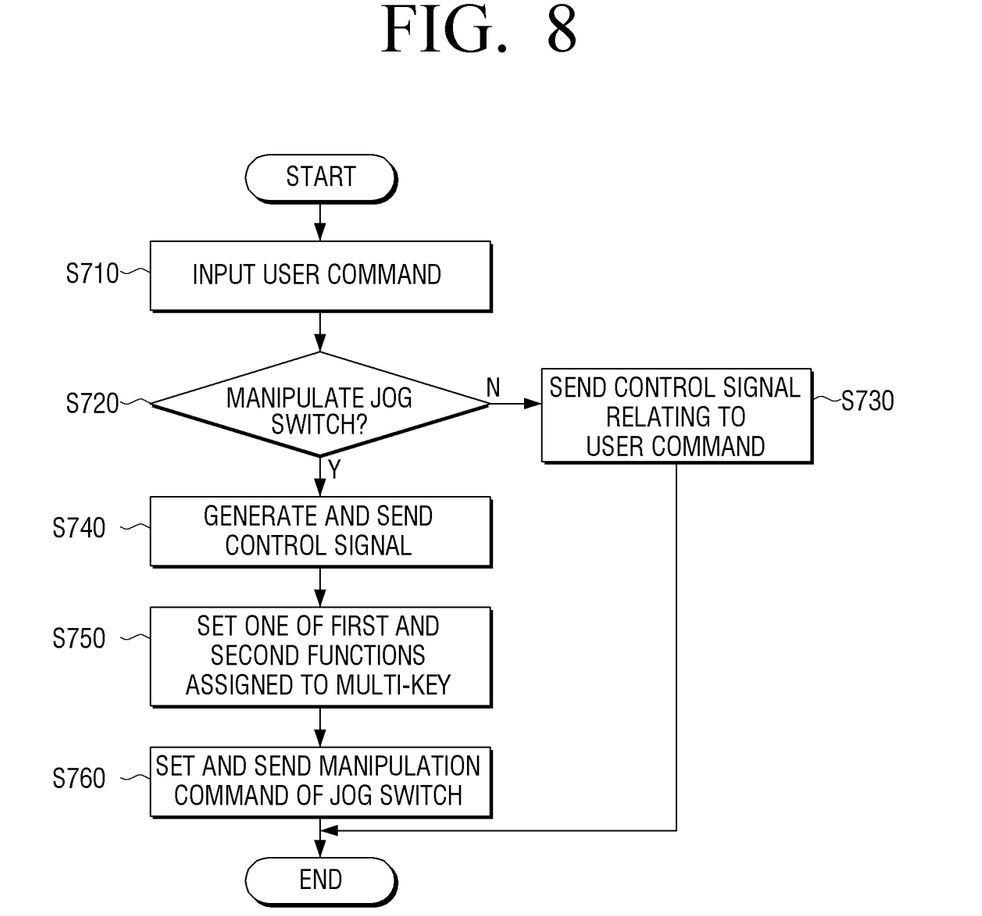
FIG. 8 is a flowchart of a method for controlling operations of the display apparatus in the remote control apparatus according to an exemplary embodiment.

FIG. 8 is a flowchart of a method for controlling the operation of the display apparatus in the remote control apparatus according to an exemplary embodiment.

As shown in FIG. 8, the remote control apparatus receives the user command related to the function control of the display apparatus, from the user through the buttons of the remote control apparatus (operation S710). Herein, the buttons include the single key assigned the single function and the multi-key assigned the multiple functions, that is, the first and second functions. The single key and the multi-key have been described earlier and shall be omitted.

After the user command is input, the remote control apparatus checks whether the user command related to the manipulation of the jog switch allowing the directional movement manipulation and the push manipulation is input (operation S720). When checking that the user command relating to the jog switch manipulation is not input within the preset threshold time, the remote control apparatus sends the control signal related to the user command input through the buttons, to the display apparatus (operation S730).

When checking that the user command related to the jog switch manipulation is input within the preset threshold time, the remote control apparatus generates and sends the control signal to set a different function of the display apparatus, to the display apparatus (operation S740). That is, when the user command relating to the single key is input, the remote control apparatus can send the control signal relating to the input user command to the display apparatus in operation S730. However, when the user command relating to the multi-key is input, the remote control apparatus checks whether the user command relating to the jog switch manipulation is input within the preset threshold time in operation S720. When the user command is not input within the preset threshold time, the remote control apparatus can generate and send the control signal for controlling the function of the display apparatus with the user command relating to the multi-key, to the display apparatus. By contrast, when the user command is input within the preset threshold time, the remote control apparatus can generate and send the control signal to set a different function of the display apparatus, to the display apparatus.

The present application is not limited to this exemplary embodiment. When the user command related to the multi-key is input during the preset threshold time in operation S710, the remote control apparatus can determine the command to set a different function of the display apparatus, and generate and send the corresponding control signal to the display apparatus.

The display apparatus receiving the control signal can display the OSD menu guiding the first and second functions assigned to the corresponding multi-key on the screen. When the OSD menu is displayed and the user moves the jog switch, the remote control apparatus sets one of the first and second functions assigned to the multi-key (operation S750). In detail, when the OSD menu guiding the first and second functions assigned to the corresponding multi-key is displayed on the screen of the display apparatus, and the user moves the jog switch, the remote control apparatus generates and sends the control signal corresponding to the manipulation to the display apparatus. Hence, the display apparatus highlights and displays the region corresponding to the received control signal among the first and second regions guiding the first and second functions.

Next, when the user pushes the jog switch, the remote control apparatus can change the function of the corresponding multi-key to the function corresponding to the highlighted region among the first and second functions. Next, when the user command of the corresponding multi-key is input, the remote control apparatus can generate and send the control signal relating to the changed function to the display apparatus so that the display apparatus can operate based on the changed function.

Among the first and second functions assigned to the multi-key, it is preferred that the first function is set to the multi-key by priority and the second function is additionally set to the multi-key. Thus, when the corresponding multi-key is not input during the preset threshold time while the user sets the multi-key to the second function, the remote control apparatus can restore the second function of the multi-key to the first function according to the preset condition.

When the manipulation command is input through the jog switch, the remote control apparatus can control the display apparatus to perform the different operation according to the operation mode of the display apparatus. As such, how the jog switch of the remote control apparatus performs the different operation according to the operation command of the display apparatus is now explained.

Figure 9:
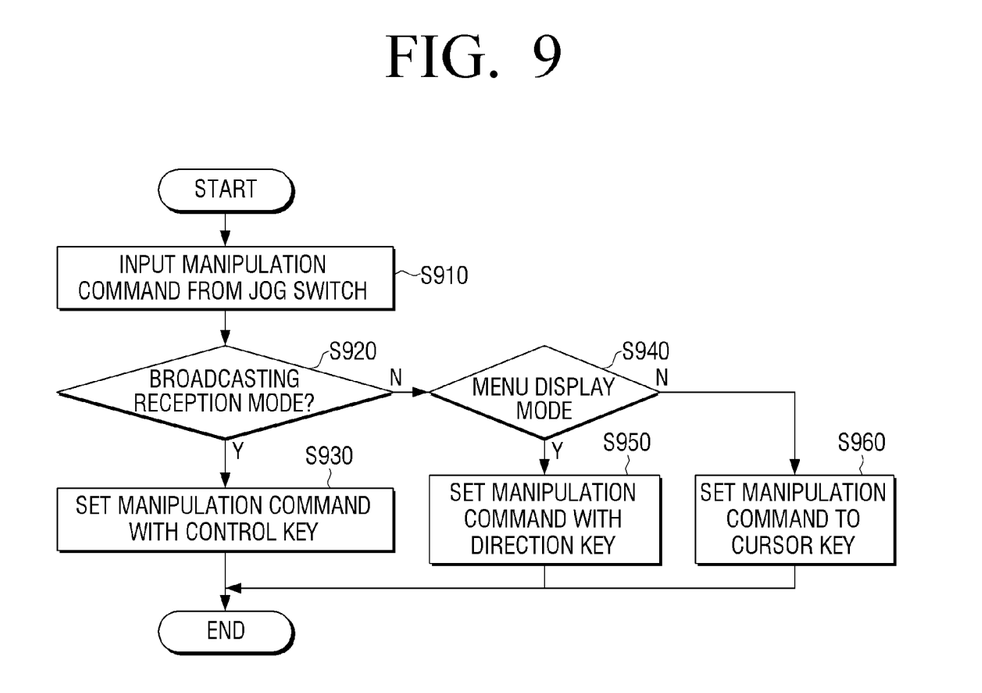
FIG. 9 is a flowchart of a method for setting a function of the jog switch in the remote control apparatus according to an exemplary embodiment.

FIG. 9 is a flowchart of a method for setting the function of the jog switch in the remote control apparatus according to an exemplary embodiment.

As shown in FIG. 9, the remote control apparatus receives the manipulation command of the user from the jog switch (operation S910). When the manipulation command is input from the jog switch, the remote control apparatus checks the operational mode of the display apparatus. More specifically, when the manipulation command is input from the jog switch, the remote control apparatus determines whether the display apparatus operates in the broadcasting reception mode (operation S920). When determining that the display apparatus operates in the broadcasting reception mode, the remote control apparatus sets the manipulation command of the jog switch to the manipulation command of the control key for adjusting the broadcasting reception channel or the volume of the display apparatus (operation S930). When the jog switch operates as the control key, the display apparatus can adjust the broadcasting reception channel or the volume according to the movement manipulation in one of the up, down, left, and right directions of the jog switch.

When determining that the display apparatus does not operate in the broadcasting reception mode, the remote control apparatus determines whether the display apparatus operates in the menu display mode (operation S930). When determining that the display apparatus is operating in the menu display mode, the remote control apparatus sets the manipulation command of the jog switch to the manipulation command of the direction key for navigating the menu displayed by the display apparatus (operation S940). When the jog switch operates as the direction key, the display apparatus can highlight the OSD menu displayed at the position corresponding to the movement manipulation in one of the up, down, left, and right directions of the jog switch.

When checking that the display apparatus does not operate in the menu display mode, the remote control apparatus determines that the display apparatus operates in the web browser mode and sets the operation command of the jog switch to the operation command of the cursor key for moving the cursor displayed on the screen of the display apparatus (operation S950). When the jog switch serves as the cursor key, the display apparatus can move the cursor displayed on the screen, in the direction corresponding to the movement manipulation in the 360-degree direction of the jog switch.

As set forth above, according to various exemplary embodiments, the remote control apparatus can simplify the size, the structure, and the number of the buttons of the remote control apparatus by including the jog switch allowing a 360-degree direction manipulation, and the plurality of the buttons for controlling the functions. Also, the display apparatus displays the OSD menu relating to the buttons of the remote control apparatus so that the user can use the remote control apparatus more easily.

Although a few exemplary embodiments have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A remote control apparatus comprising:
    a communication device which communicates with a display apparatus;
    input buttons which input a user command related to controlling functions of the display apparatus;
    a jog switch which allows directional movement manipulation and push manipulation; and
    a controller which, after the user command is input through the input buttons, generates and sends a control signal to set a different function of the display apparatus based on a manipulation state of the jog switch,
    wherein the input buttons comprise:
        a single key which is assigned a single function; and
        at least one multi-key which is assigned a first function and a second function, and
    wherein, after the multi-key is input, when at least one of the movement manipulation and the push manipulation of the jog switch is conducted within a preset threshold time, the controller sets one of the first function and the second function to the multi-key and controls the display apparatus to operate in the set function.

2. The remote control apparatus of claim 1, wherein the first function is set to the multi-key by a priority and the second function is additionally set to the multi-key, and when the multi-key is set to the second function and the multi-key is not input during the preset threshold time, the controller restores the function of the multi-key to the first function.

3. The remote control apparatus of claim 1, wherein the first function comprises at least one of a mute function, a play function, a three-dimensional (3D) function, and a remote control function, and
    the second function comprises a color key function relating to additional services provided by the display apparatus.

4. The remote control apparatus of claim 3, wherein, when the multi-key is set to the first function and the multi-key is input, the controller controls the multi-key to operate one of the mute function, the play function, the 3D function, and the remote control function, according to an operation mode of the display apparatus.

5. The remote control apparatus of claim 3, wherein, when a manipulation command is input through the jog switch, the controller controls the display apparatus to perform a different operation according to an operation mode of the display apparatus.

6. The remote control apparatus of claim 5, wherein, when the display apparatus is in a broadcasting reception mode, the jog switch operates as a control key for adjusting a broadcasting reception channel or a volume of the display apparatus,
    when the display apparatus is in a menu display mode, the jog switch operates as a direction key for navigating the displayed menu, and
    when the display apparatus is in a web browser mode, the jog switch operates as a cursor key for moving a cursor displayed on a screen.

7. The remote control apparatus of claim 6, wherein the jog switch operates as an enter key or an exit key according to the push manipulation.

8. The remote control apparatus of claim 7, wherein, when the jog switch is moved or pushed, the controller determines a movement direction of the jog switch based on two signal levels corresponding to X and Y axis slopes generated by the corresponding movement manipulation or push manipulation, and sends the determined direction information to the display apparatus.

9. A display apparatus comprising:
    a display;
    a communication device which communicates with a remote control apparatus;
    a storage device which stores information for performing a first function corresponding to a control signal received from the remote control apparatus; and
    a controller which, in response to receiving a control signal from the remote control apparatus to set a second function of the display apparatus which is different from the first function, displays on the display a menu to set a plurality of functions corresponding to the control signal on a screen,
    wherein the control signal is generated by a user command input through a multi-key for receiving a user command related to function control of the display apparatus and a jog switch which allows directional movement manipulation and push manipulation in the remote control apparatus, and
    wherein, after the multi-key is input, when at least one of the movement manipulation and the push manipulation of the jog switch is conducted within a preset threshold time, the controller sets one of the first function and the second function to the multi-key and controls the display apparatus to operate in the set function.

10. A method for controlling functions of a display apparatus in a remote control apparatus, the method comprising:
receiving a user command related to the control of the functions of the display apparatus, from a user;
after the user command is received, generating a control signal to set a different function of the display apparatus according to a manipulation state of a jog switch allowing directional movement manipulation and push manipulation; and
sending the generated control signal to the display apparatus,
wherein the inputting operation receives the user command through input buttons comprising a single key which is assigned a single function, and at least one multi-key which is assigned a first function and a second function, and
wherein the method further comprises, after the user command is input through the multi-key, when at least one of the movement manipulation and the push manipulation of the jog switch is conducted within a preset threshold time, setting one of the first function and the second function assigned to the multi-key and operating the display apparatus in the set function.

11. The method of claim 10, wherein the first function is set to the multi-key by a priority and the second function is additionally set to the multi-key, and
when the multi-key is set to the second function and the multi-key is not input during the preset threshold time, the setting operation restores the function of the multi-key to the first function.

12. The method of claim 10, wherein the first function comprises at least one of a mute function, a play function, a 3D function, and a remote control function, and
the second function comprises a color key function related to additional services provided by the display apparatus.

13. The method of claim 12, further comprising:
when a manipulation command is input through the jog switch, setting a manipulation command of the jog switch so that the display apparatus performs a different operation according to an operational mode of the display apparatus; and
sending the set manipulation command to the display apparatus.

14. The method of claim 13, wherein the operation for setting the manipulation command comprises that the jog switch operates as a control key for adjusting a broadcasting reception channel or a volume of the display apparatus when the display apparatus is in a broadcasting reception mode,
the jog switch operates as a direction key for navigating the displayed menu when the display apparatus is in a menu display mode, and
the jog switch operates as a cursor key for moving a cursor displayed on a screen when the display apparatus is in a web browser mode.

15. The method of claim 14, wherein the jog switch operates as an enter key or an exit key according to the push manipulation.

16. The method of claim 15, wherein, when the jog switch is moved or pushed, the operation for sending the set manipulation command determines a movement direction of the jog switch based on two signal levels corresponding to X and Y axis slopes generated by the corresponding movement manipulation or push manipulation, and sends the determined direction information to the display apparatus.

17. A remote control apparatus for controlling functions of a display apparatus, the remote control comprising:
a first set of keys comprising at least one single key which is assigned a single function;
a second set of keys comprising at least one multi-key which is assigned a first function and a second function;
a jog switch which allows directional movement and push movement, and generates and transmits control signals to the display apparatus to set different functions of the display apparatus based on a manipulation of the jog switch; and
a controller configured to, after the multi-key is input, when at least one of the directional movement and the push movement of the jog switch is conducted within a preset threshold time, set one of the first function and the second function to the multi-key and control the display apparatus to operate in the set function.

18. The remote control apparatus of claim 17, wherein the first function is at least one of a mute function, a play function, a three-dimensional (3D) function, and a remote control function.

19. The remote control apparatus of claim 17, wherein the second function is additionally set to the multi-key.

* * * * *